(12) United States Patent
Mizuno

(10) Patent No.: US 11,997,389 B2
(45) Date of Patent: May 28, 2024

(54) CONTROL APPARATUS, METHOD, AND STORAGE MEDIUM

(71) Applicant: CANON KABUSHIKI KAISHA, Tokyo (JP)

(72) Inventor: Takayoshi Mizuno, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/049,216

(22) Filed: Oct. 24, 2022

(65) Prior Publication Data

US 2023/0188856 A1    Jun. 15, 2023

(30) Foreign Application Priority Data

Oct. 26, 2021 (JP) ................................. 2021-174477

(51) Int. Cl.
*H04N 23/695*  (2023.01)
*H04N 23/60*  (2023.01)
*H04N 23/69*  (2023.01)

(52) U.S. Cl.
CPC ........... *H04N 23/695* (2023.01); *H04N 23/64* (2023.01); *H04N 23/69* (2023.01)

(58) Field of Classification Search
CPC ...... H04N 23/695; H04N 23/64; H04N 23/69; H04N 23/661
See application file for complete search history.

(56) References Cited

U.S. PATENT DOCUMENTS 7,349,011 B2 * 3/2008 Hirasawa ........... H04N 1/00482
348/207.99

FOREIGN PATENT DOCUMENTS

JP    2016058984 A    4/2016

* cited by examiner

*Primary Examiner* — Yogesh K Aggarwal
(74) *Attorney, Agent, or Firm* — Canon U.S.A., Inc., IP Division

(57) ABSTRACT

A control apparatus for an imaging unit configured to change an imaging region by controlling at least one of pan, tilt, and zoom is provided whereby the control apparatus is configured to perform control for sequentially changing an image quality setting of an imaging unit based on a current imaging region, an imaging region associated with a preset setting, an image quality setting associated with the preset setting, and a current image quality setting.

6 Claims, 8 Drawing Sheets

CONTROL APPARATUS, METHOD, AND STORAGE MEDIUM

BACKGROUND

Field

The present disclosure relates to a control apparatus, a method, and a storage medium.

Description of the Related Art

In a video image production market, a network system for controlling a network camera from a remote place becomes increasingly common. Some of such network systems have a preset function. According to the preset function, by storing a desired state in advance with regard to an imaging state such as pan, tilt, zoom, or focus, the state can be reproduced.

Japanese Patent Laid-Open No. 2016-58984 proposes a technique for saving at least one or more of a pan position, a tilt position, a zoom position, or an image quality parameter for viewing a shooting object with an image quality as a preset position and performing a collective control.

In a case where a preset setting of pan, tilt, and zoom (hereinafter, denoted as PTZ) and an image quality is carried out, when the preset setting is to be reproduced, there is a fear that an appropriate video image is not obtained depending on a timing at which the image quality setting associated with the preset setting is reflected. It is conceivable to reflect the image quality setting associated with the preset setting at a timing at which a PTZ movement is to be started or the PTZ movement is to be ended. In this case, in particular, when a difference to a predetermined extent or more occurs between the image quality setting at the start of the PTZ movement and the image quality setting associated with the preset setting, there is a fear that the video image is not to have an appropriate image quality. In a case where the image quality setting associated with the preset setting is to be reflected at the start of the PTZ movement, since this image quality setting associated with the preset setting is an image quality setting intended to the video image at the end of the PTZ movement, there is a possibility that the image quality setting is not matched to the video image from the start of the PTZ movement before the end of the PTZ movement. In addition, in a case where the image quality setting associated with the preset setting is to be reflected at the end of the PTZ movement, since a large change occurs in the image quality setting, an inappropriate video image may be produced due to flicker generated in the video image or the like.

According to Japanese Patent Laid-Open No. 2016-58984, the timing at which the image quality setting associated with the preset setting is to be reflected is not taken into account.

SUMMARY

To make it possible to obtain an appropriate video image in a case where a preset setting of an imaging region and an image quality is carried out, a control apparatus for an imaging apparatus according to an aspect of the present disclosure is a control apparatus for an imaging unit configured to change an imaging region by controlling at least one of pan, tilt, and zoom, the control apparatus including a memory storing instructions, and one or more processors that, upon execution of the stored instructions is configured to obtain information of an imaging region associated with a preset setting and information of an image quality setting associated with the preset setting and perform control for sequentially changing an image quality setting of the imaging unit during a period for controlling the imaging region of the imaging unit from the current imaging region to the imaging region associated with the preset setting, wherein the control is performed based on a current imaging region of the imaging unit, the imaging region associated with the preset setting, a current image quality setting of the imaging unit, and the image quality setting associated with the preset setting.

Further features of the present disclosure will become apparent from the following description of exemplary embodiments with reference to the attached drawings.

DESCRIPTION OF THE EMBODIMENTS

Hereinafter, embodiments of the present disclosure will be described with reference to the accompanying drawings.

First Embodiment

Figure 1:
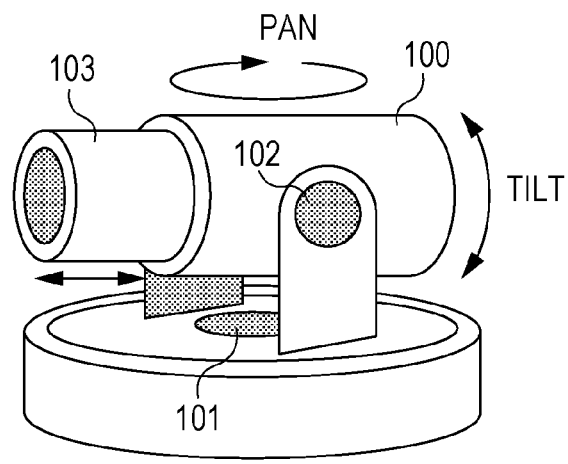
FIG. 1 is an external appearance view of a network camera according to a first embodiment.

FIG. 1 is an external appearance view of a network camera 100 according to a first embodiment (hereinafter, simply referred to as a camera). The camera 100 is a digital camera configured to capture image data of a still image or a moving image, and includes a pan drive mechanism 101, a tilt drive mechanism 102, and a zoom mechanism 103. The pan drive mechanism 101 can change an imaging region of the camera 100 in a pan direction, and rotates in a range of, for example, −170 degrees to 170 degrees. The tilt drive mechanism 102 can change the imaging region of the camera 100 in a tilt direction and rotates in a range of, for example, −30 degrees in a horizontal direction to +90 degrees in an upward direction. The zoom mechanism 103 changes a viewing angle corresponding to the imaging region of the camera 100.

The configured camera 100 is an example of an imaging apparatus in which an imaging region determined by a PTZ position is set to be variable, and an image quality setting is also set to be variable. The image quality setting includes at least any one of settings of focus, exposure, white balance, noise reduction, camera shake correction, and sharpness.

Figure 2:
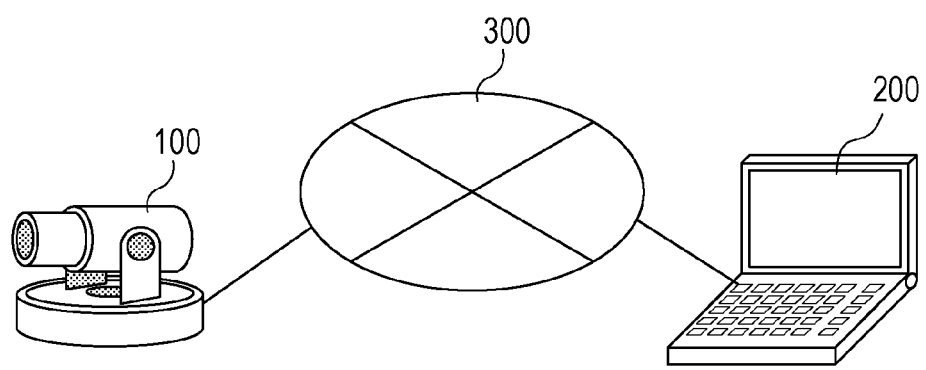
FIG. 2 illustrates a configuration of a network system according to the first embodiment.

FIG. 2 illustrates a configuration of a network system including the camera 100 according to the first embodiment. The camera 100 and a client apparatus 200 that is an external device are connected to each other so as to be mutually communicable via a network 300. The client apparatus 200 is configured to perform a control of the viewing angle or the image quality, a registration of the preset setting, a control related to reproduction, and the like for the camera 100. The camera 100 transmits responses to those commands to the client apparatus 200.

Figure 3:
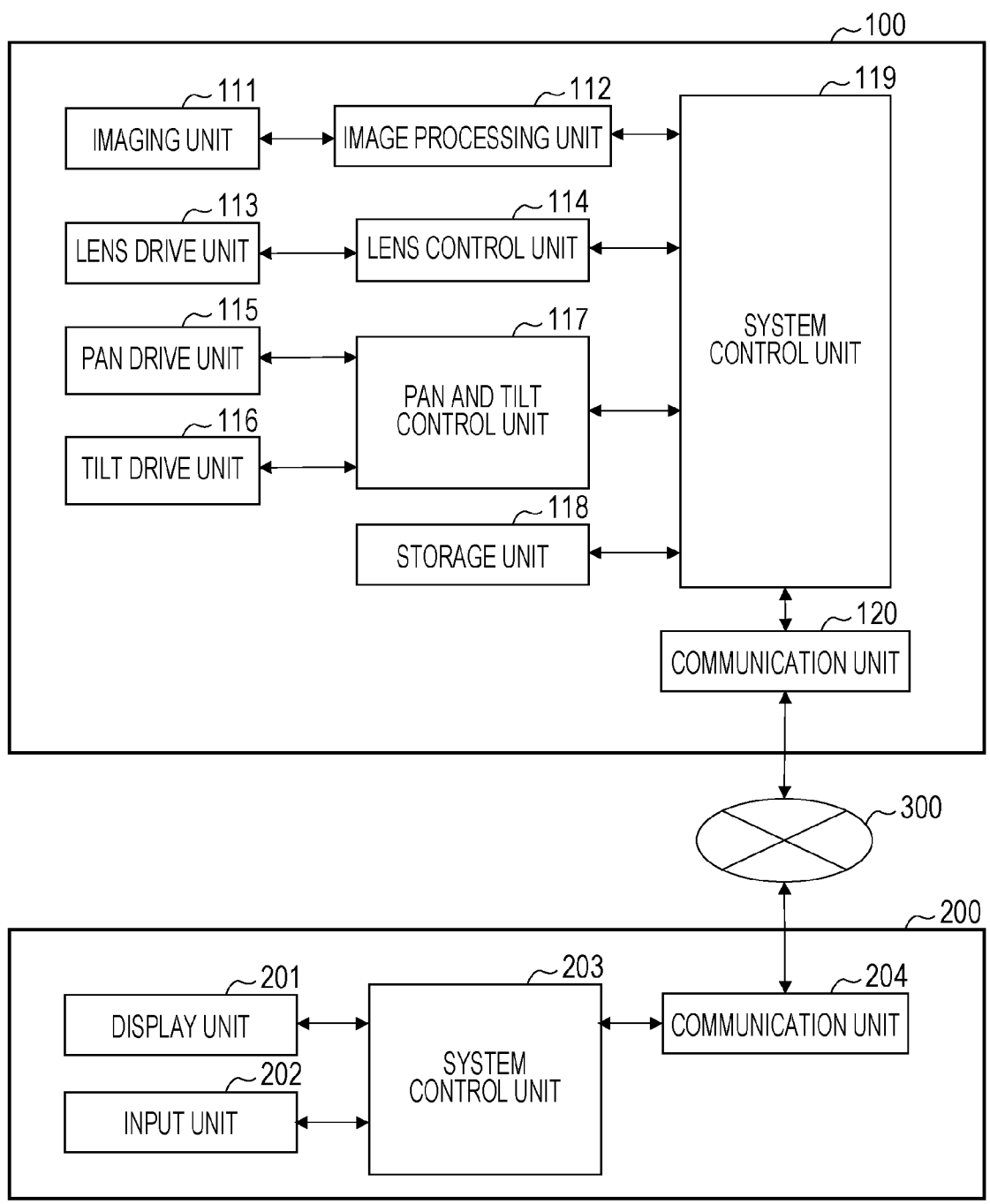
FIG. 3 illustrates a configuration of the network camera and a client apparatus according to the first embodiment.

FIG. 3 illustrates a configuration of the camera 100 and the client apparatus 200 according to the first embodiment.

First, with reference to FIG. 3, a configuration of the camera 100 will be described.

The camera 100 includes an imaging unit 111, an image processing unit 112, a lens drive unit 113, a lens control unit 114, a pan drive unit 115, a tilt drive unit 116, a pan and tilt control unit 117, a storage unit 118, a system control unit 119, and a communication unit 120.

The imaging unit 111 is configured to perform imaging of an object and conversion into an electric signal.

The image processing unit 112 is configured to perform predetermined image processing and encoding processing on the signal imaged and photoelectrically converted by the imaging unit 111 and to generate image data. The number of pieces of image data to be generated is not limited to only one, and a plurality of pieces of image data with different resolutions or video image qualities may also be generated at the same time. The image processing unit 112 transmits the generated image data to the system control unit 119.

The lens drive unit 113 includes a focus lens and a drive system of a zoom lens (corresponding to the zoom mechanism 103 in FIG. 1), and an operation of the lens drive unit 113 is controlled by the lens control unit 114.

The lens control unit 114 is configured to perform control on the lens drive unit 113 based on an instruction passed from the system control unit 119. In addition, the lens control unit 114 transmits focus movement information or zoom movement information to the system control unit 119.

The pan drive unit 115 is equivalent to the pan drive mechanism 101 in FIG. 1, and constituted by a mechanical drive system configured to perform a pan drive and a motor as a drive source. An operation of the pan drive unit 115 is controlled by the pan and tilt control unit 117.

The tilt drive unit 116 is equivalent to the tilt drive mechanism 102 in FIG. 1, and constituted by a mechanical drive system configured to perform a tilt drive, and a motor as a drive source. An operation of the tilt drive unit 116 is controlled by the pan and tilt control unit 117.

The pan and tilt control unit 117 is configured to perform a control on the pan drive unit 115 and the tilt drive unit 116 based on an instruction passed from the system control unit 119.

The storage unit 118 is configured to save the image data, various types of setting commands, and the like. In addition, the storage unit 118 saves a preset setting to be recorded by the preset function. The preset setting includes PTZ (for example, a PTZ position which is set as a target or a PTZ drive speed (or a PTZ execution time period)) associated with the preset setting, or the image quality setting associated with the preset setting. The image quality setting includes at least any one of settings of focus, exposure, white balance, noise reduction, camera shake correction, and sharpness.

The system control unit 119 is configured to analyze a camera control command transmitted from the client apparatus 200, and performs processing in accordance with the camera control command. The system control unit 119 performs an instruction of an image quality adjustment to the image processing unit 112, an instruction of a zoom or focus control to the lens control unit 114, and an instruction of a pan and tilt operation to the pan and tilt control unit 117. In addition, the system control unit 119 obtains the image data generated by the image processing unit 112 and transmits the image data to the communication unit 120. In addition, the system control unit 119 performs a preset control for reproducing the preset setting.

The communication unit 120 is configured to transmit the image data transmitted from the system control unit 119 to the client apparatus 200. In addition, the communication unit 120 receives various types of setting commands and camera control commands transmitted from the client apparatus 200, and passes those commands to the system control unit 119. In addition, the communication unit 120 transmits, to the client apparatus 200, responses of the camera 100 to the commands transmitted from the client apparatus 200.

It is noted that the configuration of the camera 100 illustrated in FIG. 3 is an example, and is not limited to this.

In addition, with reference to FIG. 3, a configuration of the client apparatus 200 will be described. A general-use computer such as a personal computer or a mobile terminal such as a tablet is used as the client apparatus 200.

The client apparatus 200 includes a display unit 201, an input unit 202, a system control unit 203, and a communication unit 204.

A display apparatus such as a liquid crystal projector or a liquid crystal monitor is used as the display unit 201. The display unit 201 is configured to display the image obtained from the camera 100 or display a graphical user interface (GUI) for performing a camera control.

A keyboard, a pointing device such as a mouse or a touch panel, or the like is used as the input unit 202. A user of the client apparatus 200 operates the GUI via the input unit 202.

The communication unit 204 is configured to transmit, to the camera 100, various types of setting commands and camera control commends transmitted from the system control unit 203. In addition, the communication unit 204 transmits, to the system control unit 203, the image data transmitted from the camera 100 and the responses of the camera 100 to the commands transmitted from the client apparatus 200.

The system control unit 203 is configured to generate various types of setting commands and camera control commends according to the GUI operations of the user and to transmit those commands to the camera 100 via the communication unit 204. In addition, the system control unit 203 receives, via the communication unit 204, the responses of the camera 100 to the various types of setting commands and camera control commends which have been transmitted. In addition, the system control unit 203 displays the image data received from the camera 100 via the communication unit 204 on the display unit 201. In this manner, the client apparatus 200 can perform various types of camera controls on the camera 100 via the network 300.

It is noted that the configuration of the client apparatus 200 illustrated in FIG. 3 is an example, and is not limited to this.

Hereinafter, with reference to FIG. 4 and FIG. 5, the processing executed by the camera 100 will be described. According to the present embodiment, as the preset control for the reproduction of the preset setting, the camera 100 performs an image quality control that is a control for a change into the image quality setting associated with the preset setting by a relative value designation in accordance with a PTZ control that is a control for a change into the PTZ associated with the preset setting.

Figure 4:
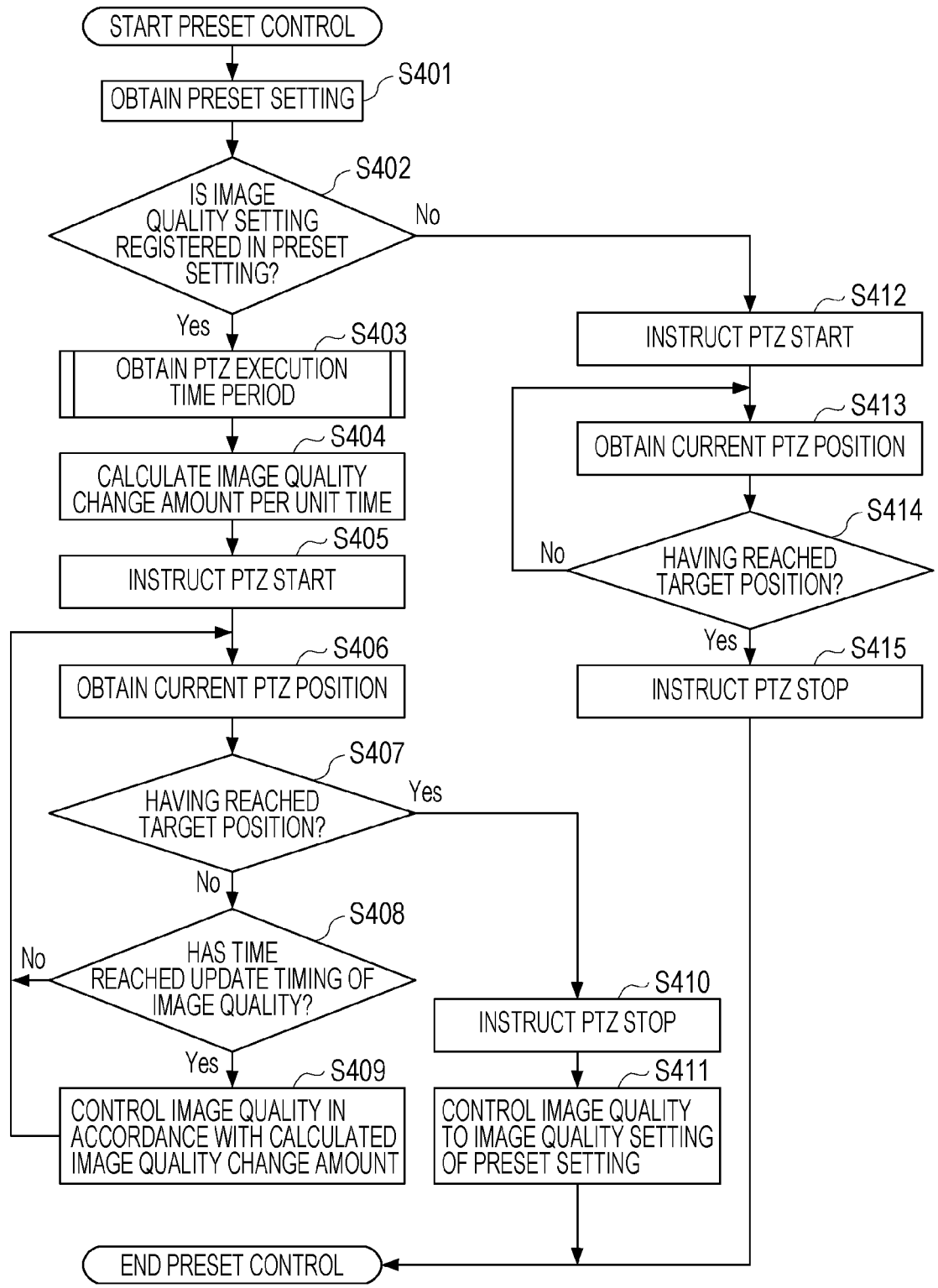
FIG. 4 is a flowchart illustrating preset control processing executed by the network camera according to the first embodiment.
Figure 5:
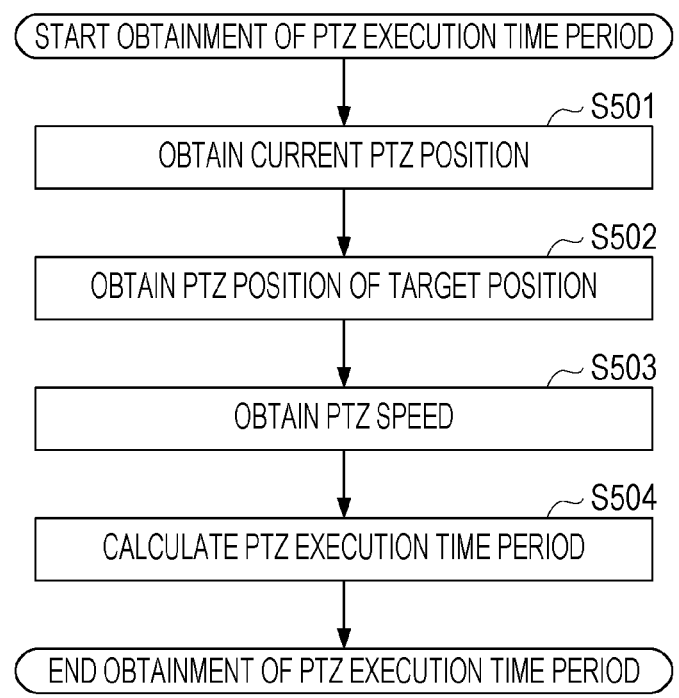
FIG. 5 is a flowchart illustrating obtaining processing of a PTZ execution time period in FIG. 4.

FIG. 4 is a flowchart illustrating the preset control processing executed by the camera 100.

In step S401, the system control unit 119 obtains a preset setting to be reproduced from the storage unit 118. The preset setting includes, for example, a PTZ position (hereinafter, referred to as a target position), a PTZ drive speed, and an image quality setting.

In step S402, the system control unit 119 determines whether or not the image quality setting is registered in the preset setting obtained in step S401. In a case where it is determined that the image quality setting is registered, the flow proceeds to step S403. In a case where it is determined that the image quality setting is not registered, the flow proceeds to step S412. It is noted that the block is omitted in FIG. 4, but in a case where it is determined that the image quality setting is registered, the system control unit 119 is caused to obtain the current image quality setting in a stage preceding the upcoming step S404.

In step S403, the system control unit 119 obtains a PTZ execution time period that is a time period for executing the PTZ control. Obtaining processing of the PTZ execution time period will be described with reference to FIG. 5 below.

In step S404, the system control unit 119 calculates an image quality change amount per unit time in accordance with the image quality setting associated with the preset setting which is obtained in step S401, the current image quality setting (image quality setting before the image quality control), and the PTZ execution time period obtained in step S403. The image quality change amount per unit time is calculated such that the image quality control is to be completed in line with a completion timing of the PTZ control.

In step S405, the system control unit 119 performs a start instruction of the PTZ control.

In step S406, the system control unit 119 obtains a current PTZ position.

In step S407, the system control unit 119 compares the target position associated with the preset setting which is obtained in step S401 with the current PTZ position obtained in step S406 to determine whether or not the PTZ position has reached the target position. In a case where it is determined that the PTZ position has not reached the target position, the flow proceeds to step S408. In a case where it is determined that the PTZ position has reached the target position, the flow proceeds to step S410.

In step S408, the system control unit 119 determines whether or not the time has reached an update timing of the image quality. The update timing of the image quality is determined based on an elapsed time from the start of the PTZ control, for example. In a case where it is determined that the time has reached the update timing, the flow proceeds to step S409. In a case where it is determined that the time has not reached the update timing, the flow returns to step S406.

In step S409, the system control unit 119 performs the image quality control by the relative value designation in accordance with the image quality change amount per unit time which is calculated in step S404, and the flow returns to step S406.

In step S410, the system control unit 119 performs a PTZ stop instruction.

In step S411, the system control unit 119 performs the image quality control in accordance with the image quality setting associated with the preset setting which is obtained in step S401, and ends the present processing. As a result, the image quality setting is also controlled to the image quality setting associated with the preset setting in line with a timing at which the PTZ control is stopped at the target position. In addition, in a case where the PTZ position is controlled to the target position from the beginning and only the image quality setting is different, the image quality setting can be matched to the image quality setting associated with the preset setting.

In step S412, the system control unit 119 performs a start instruction of the PTZ control.

In step S413, the system control unit 119 obtains a current PTZ position.

In step S414, the system control unit 119 compares the target position associated with the preset setting which is obtained in step S401 with the current PTZ position obtained in step S413 to determine whether or not the PTZ position has reached the target position. In a case where it is determined that the PTZ position has not reached the target position, the flow returns to step S413. In a case where it is determined that the PTZ position has reached the target position, the flow proceeds to step S415.

In step S415, the system control unit 119 performs the PTZ stop instruction.

Next, with reference to FIG. 5, the obtaining processing of the PTZ execution time period in step S403 will be described. FIG. 5 is a flowchart illustrating the obtaining processing of the PTZ execution time period.

In step S501, the system control unit 119 obtains a current PTZ position (PTZ position before the PTZ control).

In step S502, the system control unit 119 obtains a target position associated with the preset setting.

In step S503, the system control unit 119 obtains a PTZ drive speed associated with the preset setting.

In step S504, the system control unit 119 calculates a PTZ execution time period in accordance with the current PTZ position obtained in step S501, the target position obtained in step S502, and the PTZ drive speed obtained in step S503.

As described above, since the camera 100 performs the image quality control by the relative value designation in accordance with the PTZ control at the time of the reproduction of the preset setting, it is possible to complete the change to the image quality setting associated with the preset setting in line with the timing at which the PTZ position reaches the target position. As a result, it is possible to naturally switch the image quality setting from the image quality setting at the start of the PTZ movement to the image quality setting at the end of the PTZ movement, and the appropriate video image can be obtained.

It is noted that according to the present embodiment, the example is used in which the preset setting of the PTZ drive speed is adopted, but is not limited to this. For example, a rule may also be adopted in which the PTZ control of the preset control is to be executed at a predetermined PTZ drive speed which has been previously set. A case where the PTZ drive speed is not variable but is constant is also included in this. In addition, a rule may be adopted in which the PTZ control of the preset control is to be executed at the PTZ drive speed when the preset control is started. In this case, it is sufficient to obtain the current PTZ drive speed in step S503.

In addition, in step S405, the image quality change amount per unit time is calculated, but an amount other than the change amount per unit time may be calculated. For example, an amount associated with the change of the PTZ, specifically, an image quality change amount in accordance with a movement distance or a rotation angle of the PTZ control may also be adopted. In this case, upon the confirmation of the update timing in step S408, instead of the elapsed time, by determining whether or not a movement distance of the viewing angle by the PTZ control or a rotation angle of a PT control exceeds a threshold, the confirmation of the update timing can be carried out.

In addition, in step S407, it is confirmed whether or not the PTZ position has reached the target position to perform the PTZ stop instruction in step S410, but a condition for determining the stop of the PTZ control is not limited to this. For example, the PTZ stop instruction may also be performed depending on whether or not the PTZ control has been executed for the PTZ execution time period calculated in step S403.

In addition, in step S409, the image quality control is performed by the relative value designation, but the configuration is not limited to this, and the image quality control may also be performed by an absolute value designation.

Second Embodiment

Next, a second embodiment will be described. It is noted that a basic configuration and a processing operation of the camera 100 are similar to those of the first embodiment. Hereinafter, descriptions common to those of the first embodiment will be omitted, and a difference from the first embodiment will be mainly described.

Hereinafter, with reference to FIG. 6, the processing executed by the camera 100 will be described. According to the present embodiment, the camera 100 performs the image quality control by a direction designation in accordance with the PTZ control as the preset control for the reproduction of the preset setting.

Figure 6:
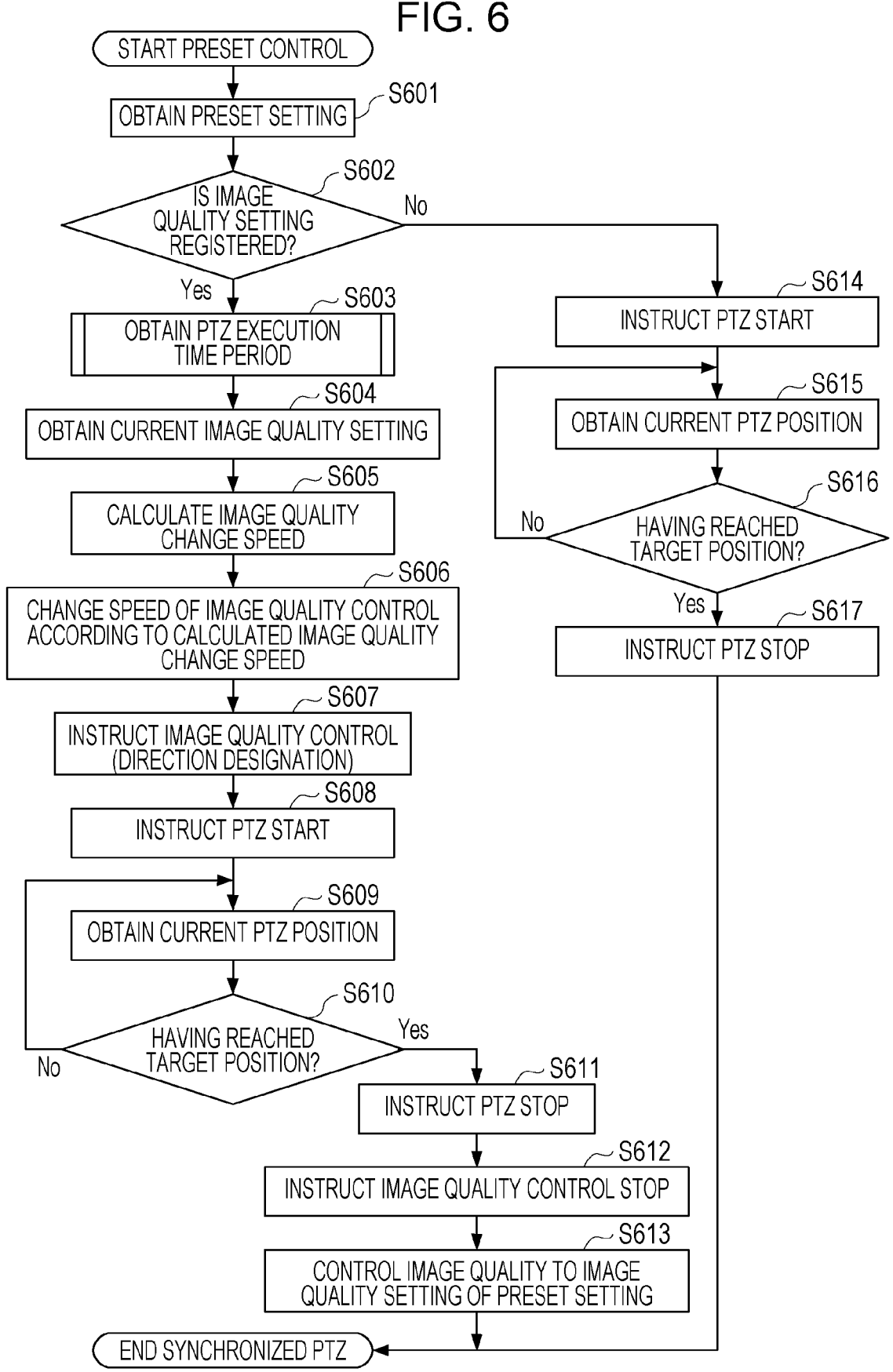
FIG. 6 is a flowchart illustrating preset control processing executed by the network camera according to a second embodiment.

FIG. 6 is a flowchart illustrating the preset control processing executed by the camera 100.

In step S601, the system control unit 119 obtains the preset setting to be reproduced from the storage unit 118. The preset setting includes, for example, a PTZ position (hereinafter, referred to as a target position), a PTZ drive speed, and an image quality setting.

In step S602, the system control unit 119 determines whether or not the image quality setting is registered in the preset setting obtained in step S601. In a case where it is determined that the image quality setting is registered, the flow proceeds to step S603. In a case where it is determined that the image quality setting is not registered, the flow proceeds to step S614.

In step S603, the system control unit 119 obtains a PTZ execution time period that is a time period for executing the PTZ control. The obtaining processing of the PTZ execution time period is similar to that described with reference to FIG. 5 according to the first embodiment.

In step S604, the system control unit 119 obtains the current image quality setting.

In step S605, the system control unit 119 calculates an image quality change speed that is a speed at which the image quality setting is to be changed based on the image quality setting associated with the preset setting obtained in step S601, the current image quality setting (image quality setting before the image quality control) which is obtained in step S604, and the PTZ execution time period obtained in step S603. The image quality change speed is calculated such that the image quality control is to be completed in line with the completion timing of the PTZ control. The image quality change speed corresponds to a focus drive speed, for example.

In step S606, the system control unit 119 changes the image quality change speed to the image quality change speed calculated in step S605.

In step S607, the system control unit 119 performs a control instruction by using a direction designation with regard to the image quality control. The control instruction using the direction designation corresponds to a control instruction in a wide end direction or a telephoto end direction in terms of the focus control, for example. In addition, the control instruction using the direction designation corresponds to a control instruction in a maximum value direction or a minimum value direction for an image quality setting having a maximum value or a minimum value.

In step S608, the system control unit 119 performs a start instruction of the PTZ control.

In step S609, the system control unit 119 obtains a current PTZ position.

In step S610, the system control unit 119 compares the target position associated with the preset setting obtained in step S601 with the current PTZ position obtained in step S609 to determine whether or not the PTZ position has reached the target position. In a case where it is determined that the PTZ position has not reached the target position, the flow returns to step S609. In a case where it is determined that the PTZ position has reached the target position, the flow proceeds to step S611.

In step S611, the system control unit 119 performs the PTZ stop instruction.

In step S612, the system control unit 119 performs a stop instruction of the image quality control.

In step S613, the system control unit 119 performs the image quality control in accordance with the image quality setting associated with the preset setting which is obtained in step S601, and ends the present processing. As a result, the image quality setting is also controlled to the image quality setting associated with the preset setting in line with the timing at which the PTZ control is stopped at the target position. In addition, the image quality setting can also be controlled to the image quality setting associated with the preset setting in a case where the PTZ position is controlled to the target position from the beginning, and only the image quality setting is different.

In step S614, the system control unit 119 performs a start instruction of the PTZ control.

In step S615, the system control unit 119 obtains a current PTZ position.

In step S616, the system control unit 119 compares the target position associated with the preset setting which is obtained in step S601 with the current PTZ position obtained in step S615 to determine whether or not the PTZ position has reached the target position. In a case where it is determined that the PTZ position has not reached the target position, the flow returns to step S615. In a case where it is determined that the PTZ position has reached the target position, the flow proceeds to step S617.

In step S617, the system control unit 119 performs the PTZ stop instruction.

As described above, since the camera 100 performs the image quality control by the direction designation in accordance with the PTZ control at the time of the reproduction of the preset setting, the change to the image quality setting associated with the preset setting can be completed in line with the timing at which the PTZ position reaches the target position. As a result, it is possible to naturally switch the image quality setting from the image quality setting at the start of the PTZ movement to the image quality setting at the end of the PTZ movement, and the appropriate video image can be obtained.

Third Embodiment

Next, a third embodiment will be described. It is noted that a basic configuration and a processing operation of the camera 100 are similar to those of the first embodiment. Hereinafter, descriptions common to those of the first embodiment will be omitted, and a difference from the first embodiment will be mainly described.

Hereinafter, with reference to FIG. 7, the processing executed by the camera 100 will be described. According to the present embodiment, the camera 100 is configured to set a control mode of the image quality setting in the preset control for the reproduction of the preset setting, and then perform the PTZ control and the image quality control.

Figure 7:
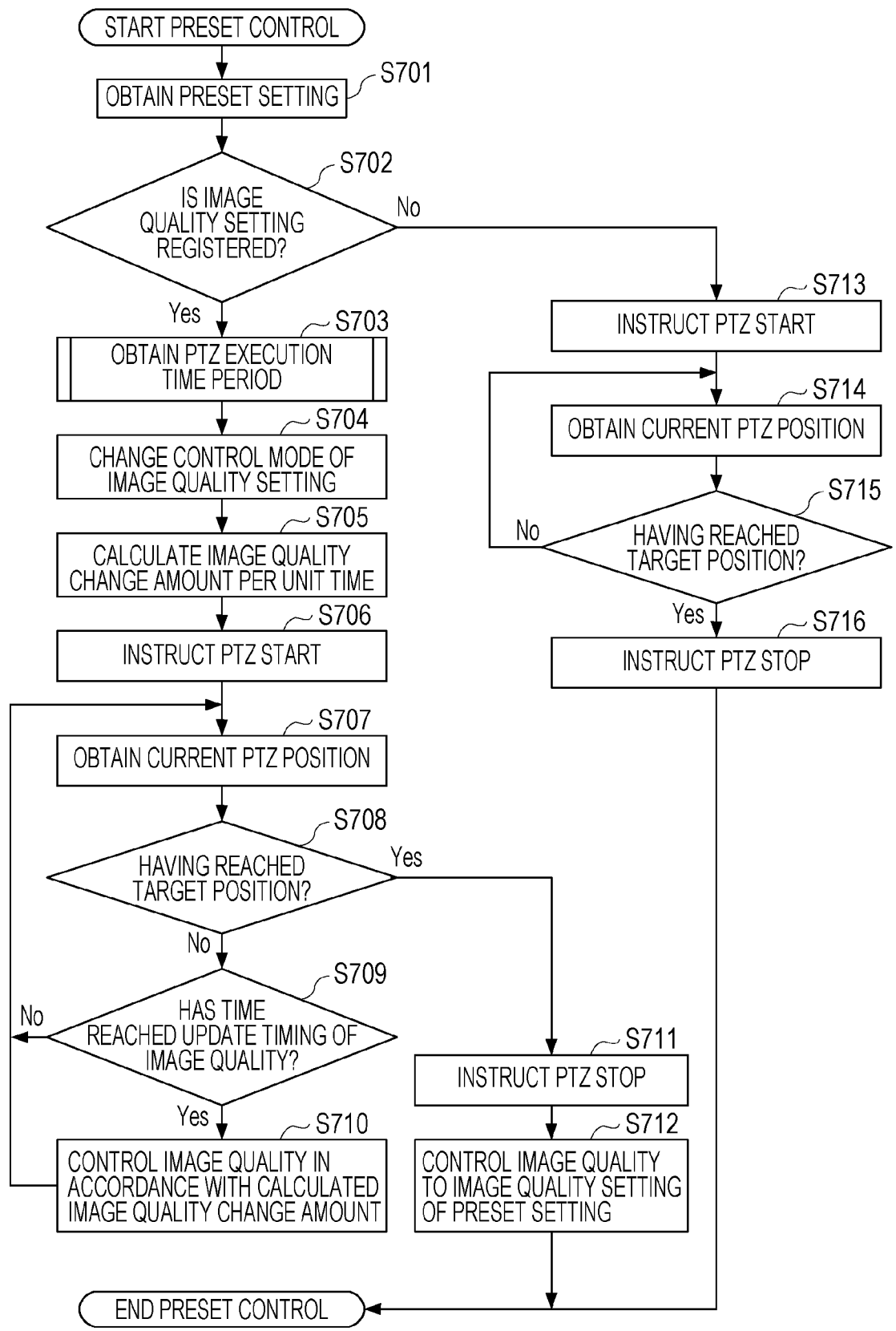
FIG. 7 is a flowchart illustrating preset control processing executed by the network camera according to a third embodiment.

FIG. 7 is a flowchart illustrating the preset control processing executed by the camera 100.

Steps S701 to S703 are processing similar to steps S401 to S403 of the first embodiment.

In step S704, the system control unit 119 changes the control mode of the image quality setting according to the image quality setting associated with the preset setting which is obtained in step S701. The control mode of the image quality setting corresponds to an automated control or a manual control of the focus control, for example. In addition to the above, switching to the automated control or the manual control is performed according to the image quality setting associated with the preset setting with regard to an image quality setting such as an exposure control or a white balance control.

Steps S705 to S716 are processing similar to steps S404 to S415 of the first embodiment. It is noted that according to the present embodiment, in step S709, the update timing of the image quality is determined based on an update cycle of the video image, for example.

As described above, the camera 100 sets the control mode of the image quality according to the image quality setting associated with the preset setting at the time of the reproduction of the preset setting, and then performs the preset control. As a result, irrespective of the control mode that has been set before the reproduction of the preset setting, the image quality control can be executed. Then, with regard to the image quality setting in which a setting value of the manual control is set for the preset setting, the change to the image quality setting associated with the preset setting can be completed in line with the timing at which the PTZ position reaches the target position. As a result, it is possible to naturally switch the image quality setting from the image quality setting at the start of the PTZ movement to the image quality setting at the end of the PTZ movement, and the appropriate video image can be obtained.

It is noted that the automated control and the manual control of the image quality setting have been mentioned in step S704, but the control mode of the image quality setting is not limited to this. For example, a setting may also be carried out with regard to an image quality setting such as a magnification of digital zoom, an intensity of camera shake correction, or an intensity of noise reduction which is not to be continuously controlled.

In addition, according to the present embodiment, the example has been described in which the processing for setting the control mode of the image quality control is added by using the preset control described according to the first embodiment as a base, but the preset control described according to the second embodiment may be used as the base.

Fourth Embodiment

Next, a fourth embodiment will be described. It is noted that a basic configuration and a processing operation of the camera 100 are similar to those of the first embodiment. Hereinafter, descriptions common to those of the first embodiment will be omitted, and a difference from the first embodiment will be mainly described.

Hereinafter, with reference to FIG. 8, the processing executed by the camera 100 will be described. According to the present embodiment, in the preset control for the reproduction of the preset setting, the camera 100 compares the image quality setting associated with the preset setting with the image quality setting before the image quality control, and when a predetermined relationship is established (for example, a difference thereof is a predetermined value or higher), the image quality control is performed in accordance with the PTZ control.

Figure 8:
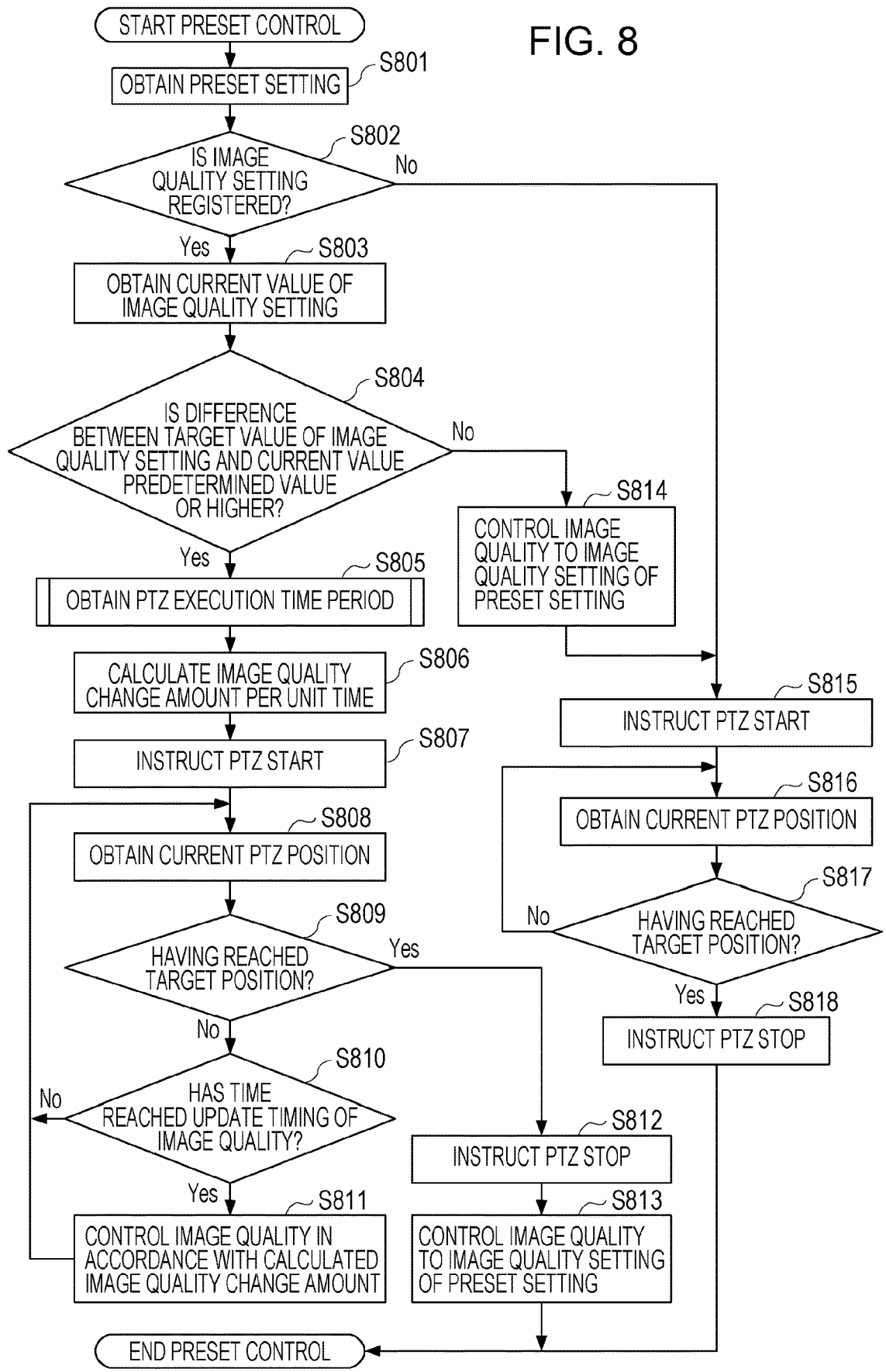
FIG. 8 is a flowchart illustrating preset control processing executed by the network camera according to a fourth embodiment.

FIG. 8 is a flowchart illustrating the preset control processing executed by the camera 100.

Steps S801 and S802 are processing similar to steps S401 and S402 of the first embodiment.

In step S803, the system control unit 119 obtains a current image quality setting (image quality setting before the image quality control).

In step S804, the system control unit 119 compares the image quality setting associated with the preset setting which is obtained in step S801 with the current image quality setting obtained in step S803 to determine whether or not a difference thereof is a predetermined value or higher. In a case where it is determined that the difference thereof is the predetermined value or higher, the flow proceeds to step S805. In a case where the difference thereof is not at the predetermined value or higher, the flow proceeds to step S814. The difference at the predetermined value or higher is previously set based on a criterion such as whether or not the video image at the start of the PTZ movement becomes an inappropriate image quality by switching to the image quality setting associated with the preset setting or whether or not the video image flickers due to the change of the image quality setting.

Steps S805 to S813 are processing similar to steps S403 to S411 of the first embodiment. It is noted that according to the present embodiment, in step S810, the update timing of the image quality is determined based on the update cycle of the video image, for example.

In step S814, the system control unit 119 performs the image quality control in accordance with the image quality setting associated with the preset setting which is obtained in step S801.

Steps S815 to S818 are processing similar to steps S412 to S415 of the first embodiment.

As described above, at the time of the reproduction of the preset setting, the camera 100 compares the image quality setting associated with the preset setting with the image quality setting before the image quality control, and only when the difference thereof is the predetermined value or higher, performs the image quality control in accordance with the PTZ control. When the difference between the image quality settings is the predetermined value or higher as described above, the change to the image quality setting associated with the preset setting can be completed in line with the timing at which the PTZ position reaches the target position. As a result, it is possible to naturally switch the image quality setting from the image quality setting at the start of the PTZ movement to the image quality setting at the end of the PTZ movement, and the appropriate video image can be obtained. On the other hand, when the difference between the image quality settings is not the predetermined value or higher, the image quality setting can be changed before the PTZ control, and the imaging can be performed at the predetermined image quality setting.

It is noted that in step S804, the image quality setting associated with the preset setting and the image quality setting before the image quality control are compared to each other, but the element to be compared is not limited to this. For example, a comparison may be performed in terms of the number of items of the image quality settings to be controlled to determine whether or not a predetermined number of items or more are to be controlled. In addition, a comparison may be performed in terms of a time period for executing the image quality control, and a branch may be chosen to perform the image quality control along with the PTZ control or to change the image quality setting before the PTZ control, depending on whether or not the time period for executing the image quality control is longer than or equal to a predetermined time period.

In addition, in step S814, the image quality control is performed in accordance with the image quality setting associated with the preset setting, but the timing of the image quality control is not limited to this. For example, the image quality control may be performed after the PTZ stop instruction in step S818, and after the PTZ position has reached the target position, the image quality control may be performed.

In addition, according to the present embodiment, the example in which the processing for comparing the image quality setting associated with the preset setting with the current image quality setting has been added by using the preset control described according to the first embodiment as the base, but the preset control described according to the second embodiment may be used as the base.

It is noted that according to the embodiment, the example has been described in which the camera 100 functions as the imaging apparatus according to one embodiment of the present disclosure and the control apparatus therefor, but for example, the control apparatus for the imaging apparatus according to one embodiment of the present disclosure may also be constituted by a computer apparatus separated from the camera 100.

Figure 9:
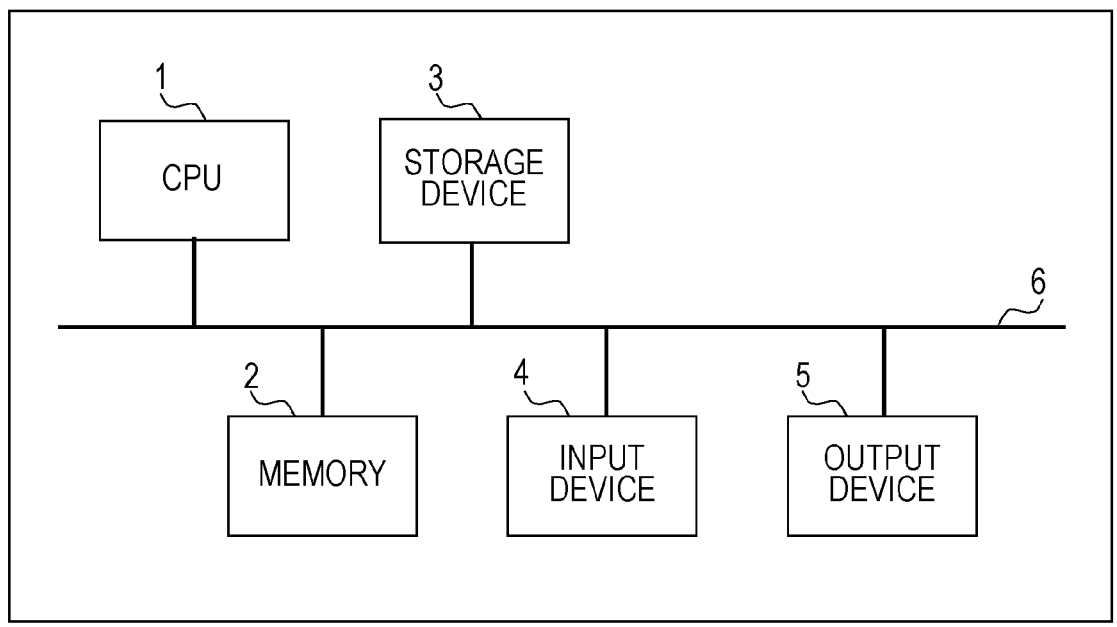
FIG. 9 illustrates an example of a hardware configuration of an apparatus functioning as a control apparatus for an imaging apparatus of the present disclosure.

FIG. 9 illustrates an example of a hardware configuration of a computer apparatus configured to function as the control apparatus for the imaging apparatus according to one embodiment of the present disclosure. The computer apparatus includes a CPU 1, a memory 2, a storage device 3, an input device 4, and an output device 5, and those respective devices are mutually connected via a bus 6.

The CPU 1 is configured to execute a program stored in the storage device 3. As a result, functions of each of obtaining units, each of calculation units, and a control unit which are mentioned in one embodiment of the present disclosure are executed. The memory 2 is configured to temporarily store programs or data read out by the CPU 1 from the storage device 3. In addition, the memory 2 is used as an area for the CPU 1 to execute various types of programs. The storage device 3 is configured to store an operation system (OS), various types of programs, and various types of data. The input device 4 is a function unit configured to accept an input from a user, and for example, a keyboard or a mouse is used. The output device 5 is configured to output information input by the input device 4 and an execution result of the program executed by the CPU 1.

The present disclosure has been described above by way of embodiments.

However, the above-mentioned embodiments are merely illustrative embodiments for carrying out the present disclosure, and a technical scope of the present disclosure is not to be restrictively interpreted based on these. That is, the present disclosure can be implemented in various forms without departing from its technical concept thereof or its main feature.

Other Embodiments

The embodiments of the present disclosure can also be realized by such processing that a program for realizing one or more functions of the above-mentioned embodiments is supplied to a system or an apparatus via a network or a storage medium, and one or more processors in a computer of the system or the apparatus read out and execute the program. In addition, the present disclosure can be realized by a circuit (for example, an ASIC) configured to realize one or more functions.

According to the embodiments described above, it is possible to obtain the appropriate video image in a case where the preset setting of the imaging region and the image quality is carried out.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-174477, filed Oct. 26, 2021, which is hereby incorporated by reference herein in its entirety.

What is claimed is:

1. A control apparatus for an imaging unit configured to change an imaging region by controlling at least one of pan, tilt, and zoom of the imaging unit, the control apparatus comprising:
a memory storing instructions; and
one or more processors that, upon execution of the stored instructions, is configured to:
obtain information on an imaging region associated with a preset setting and information on an image quality setting associated with the preset setting;
perform control for sequentially changing a current quality setting of the imaging unit during a period of controlling the imaging unit from the current imaging region to the imaging region associated with the preset setting, and
calculate an execution time period that is a time period of reaching the imaging region associated with the preset setting in accordance with the current imaging region, the imaging region associated with the preset setting, and a speed at which the imaging region is changed by controlling the imaging unit,
wherein the control is based on the current imaging region of the imaging unit, the imaging region associated with the preset setting, the current image quality setting of the imaging unit, the image quality setting associated with the preset setting, and the execution time period.

2. The control apparatus according to claim 1, wherein execution of the stored instructions further configures the one or more processors to
calculate an image quality change amount for every predetermined time period or every predetermined distance based on the execution time period, the current image quality setting, and the image quality setting associated with the preset setting, and
perform the control for sequentially changing the image quality setting of the imaging unit according to the image quality change amount for every predetermined time period or every predetermined distance during the period for controlling the imaging unit to change from the current imaging region to the imaging region associated with the preset setting.

3. The control apparatus according to claim 1, wherein execution of the stored instructions further configures the one or more processors to
perform the control for changing the image quality setting of the imaging unit according to an elapsed time period from start of the control of the imaging unit during the period for controlling the imaging unit to change from the current imaging region to the imaging region associated with the preset setting.

4. The control apparatus according to claim 1, wherein the preset setting includes information of the imaging region to be reached and information of the image quality setting to be reached, and the image quality setting includes at least any one of settings of focus, exposure, white balance, noise reduction, camera shake correction, and sharpness.

5. A control method for an imaging unit configured to change an imaging region by controlling at least one of pan, tilt, and zoom of the imaging unit, the control method comprising:
obtaining information on an imaging region associated with a preset setting and information on an image quality setting associated with the preset setting;
performing control for sequentially changing a current quality setting of the imaging unit during a period of controlling from the current imaging region to the imaging region associated with the preset setting, and
calculating an execution time period that is a time period of reaching the imaging region associated with the preset setting in accordance with the current imaging region, the imaging region associated with the preset setting, and a speed at which the imaging region is changed by controlling the imaging unit,
wherein the control is based on the current imaging region of the imaging unit, the imaging region associated with the preset setting, a current image quality setting of the imaging unit, the image quality setting associated with the preset setting, and the execution time period.

6. A non-transitory computer readable storage medium storing a program for causing a computer to perform an information processing method of an imaging unit configured to change an imaging region by controlling at least one of pan, tilt, and zoom of the imaging unit, the method comprising:
obtaining information on an imaging region associated with a preset setting and information on an image quality setting associated with the preset setting;
performing control for sequentially changing a current quality setting of the imaging unit during a period of controlling from the current imaging region to the imaging region associated with the preset setting, and
calculating an execution time period that is a time period of reaching the imaging region associated with the preset setting in accordance with the current imaging region, the imaging region associated with the preset setting, and a speed at which the imaging region is changed by the controlling the imaging unit,
wherein the control is based on the current imaging region of the imaging unit, the imaging region associated with the preset setting, a current image quality setting of the imaging unit, the image quality setting associated with the preset setting, and the execution time period.

* * * * *